Feb. 16, 1943.                    C. H. WILL                    2,311,105
              CHAIR OR SEAT STRUCTURE, AND CONTROL FOR
              SEAT BACK-ADJUSTING MECHANISM THEREOF
                      Filed Dec. 19, 1940
                                                    8 Sheets-Sheet 6

INVENTOR:
CARL H. WILL

BY

Harold Olsen
ATTORNEY

Feb. 16, 1943.   C. H. WILL   2,311,105
CHAIR OR SEAT STRUCTURE, AND CONTROL FOR
SEAT BACK-ADJUSTING MECHANISM THEREOF
Filed Dec. 19, 1940

INVENTOR:
CARL H. WILL

BY
Harold Olsen
ATTORNEY

Feb. 16, 1943.　　　C. H. WILL　　　2,311,105
CHAIR OR SEAT STRUCTURE, AND CONTROL FOR
SEAT BACK-ADJUSTING MECHANISM THEREOF
Filed Dec. 19, 1940　　　8 Sheets-Sheet 8

INVENTOR:
CARL H. WILL
BY
ATTORNEY

Patented Feb. 16, 1943

2,311,105

UNITED STATES PATENT OFFICE 2,311,105

CHAIR OR SEAT STRUCTURE, AND CONTROL FOR SEAT BACK-ADJUSTING MECHANISM THEREOF

Carl H. Will, Winnetka, Ill., assignor to Tropic-Aire, Incorporated, Chicago, Ill., a corporation of Delaware Application December 19, 1940, Serial No. 370,782

9 Claims. (Cl. 155—163)

This invention relates to a control mechanism for the adjustment of backs of seats or equivalent structures, and has among its objects to provide a relatively simple mechanism which can be easily operated by the seated occupant, which is easily assembled, relatively inexpensive to manufacture, is compact, and which does not project outside of the base of the seat structure.

The invention has thus far found its most valuable use as applied to bus seats but, of course, the invention is not limited entirely to such structures, although the invention is also claimed specifically in relation to bus or similar vehicle seats.

An object of the invention is to provide a rugged adjustable back structure and means for controlling its adjustment, and to have adjusting forces evenly distributed so that the backs will not be deformed by the hard usage to which they are submitted in bus use. This feature includes the use of a U-frame for the back which has two lower terminals or terminal portions, or in case of twin seats, of each back, separately pivoted to the base, each terminal portion having a power connection so that both positively move together in unison.

Another object is to provide an eccentric means through which adjusting motions of the seat back are controlled, and to so arrange this eccentric means or its equivalent that within the limits of adjustment of the back there can be no dead center relations.

Features of the invention include: A strong, easily releasable holding mechanism for locking the back in any of a large number of adjusted positions; the use of power means for automatically moving the back in one direction from one limit position to another, or from a number of intermediate positions to a final position; the arrangement of part of a releasing mechanism in an arm rest of a seat structure; the use of releasing means which can be operated by the fingers of a person whose arm is resting on the arm rest; the provision of a control mechanism at one side of the seat structure which can be easily pushed downwardly to release the back-holding mechanism; the arrangement of the compact releasing mechanism arranged entirely within the base of the seat, particularly so that it does not project therebelow; the use of the principle of indirect locking with a secondary lever to hold the pawl in engagement and in which there is automatic release of the pawl; the use of camming action applied at the outermost portion of the pawl to move it into locking position and hold it there; the use of saw-toothed gear teeth and the wide angle between the teeth to facilitate registration and disengagement of the pawl; the provision of a locking mechanism which is very compact in an axial direction making it possible to use the device in somewhat limited space available at the front of a bus seat; the means by which compactness in regard to depth is possible so that the entire mechanism may be arranged above a point where a coach wheel housing might interfere, thus avoiding the necessity for providing a special control mechanism on those seats which are arranged over wheel housings; the provision of a small release button having a very short motion; the use of a secondary lever to hold the pawl in engagement with the gear; the arrangement of teeth on gear and pawl to have approximately a 90° included angle; the arrangement of the pawl so that it exerts a comparatively small amount of pressure against a secondary lever, thus allowing the lever to be easily moved; the use of a reduction linkage providing in this case at least a four to one ratio of angular movement between the back and the periphery of the toothed wheel; the arrangement by which the arms and the back move in unison to substantially prevent deformation of the back when it is pulled upon against the action of the locking mechanism; and all details of construction shown, along with all broader ideas of means inherent in the disclosure.

Objects, features and advantages of the invention are disclosed in the description of the drawings, and in said drawings—

The invention is shown applied to a twin bus seat structure of a type which has one end attached to the wall of a vehicle and which has a floor pedestal as the sole remaining support. In the present structure a reclining back control mechanism for each seat is provided, the control mechanisms for one back being partly arranged on or within an arm rest at the aisle side of the seat, and the control mechanism for the second back being arranged on the base at the wall end, and not in an arm rest, since the window ledge of the vehicle serves as an arm rest at this side.

Figure 1:
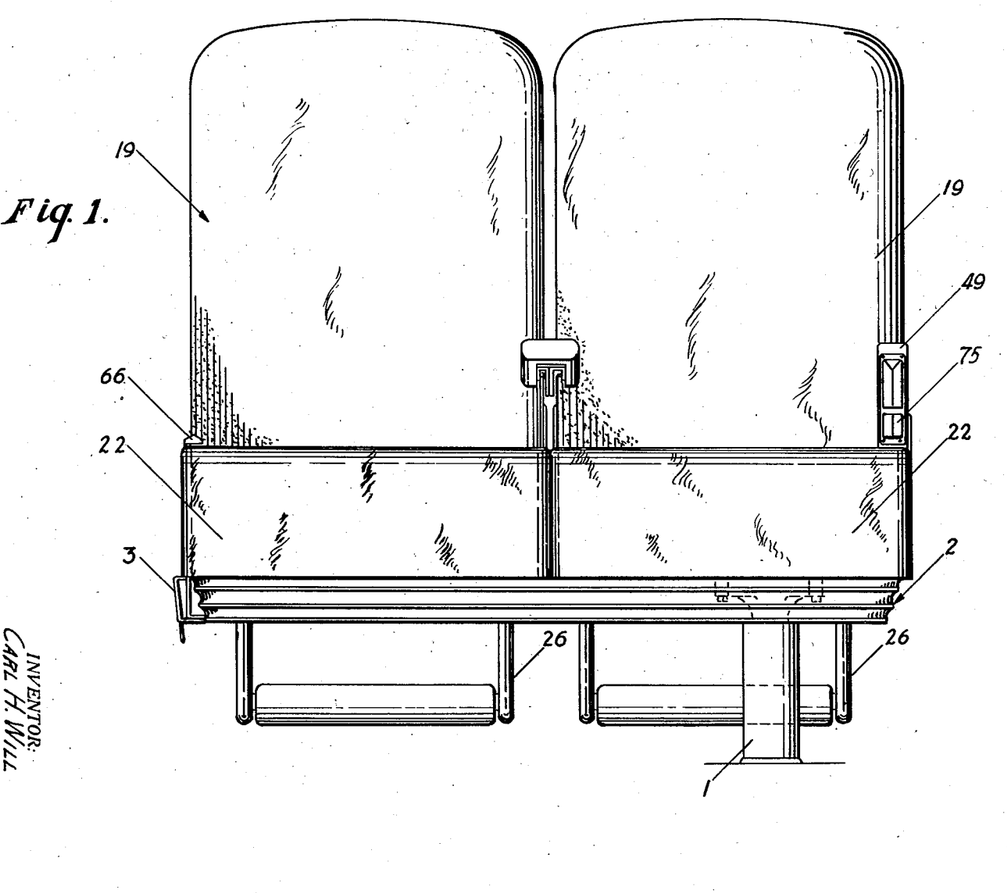
Figure 1 is a front elevation of a twin seat structure showing my invention applied thereto.
Figures 2, 7:
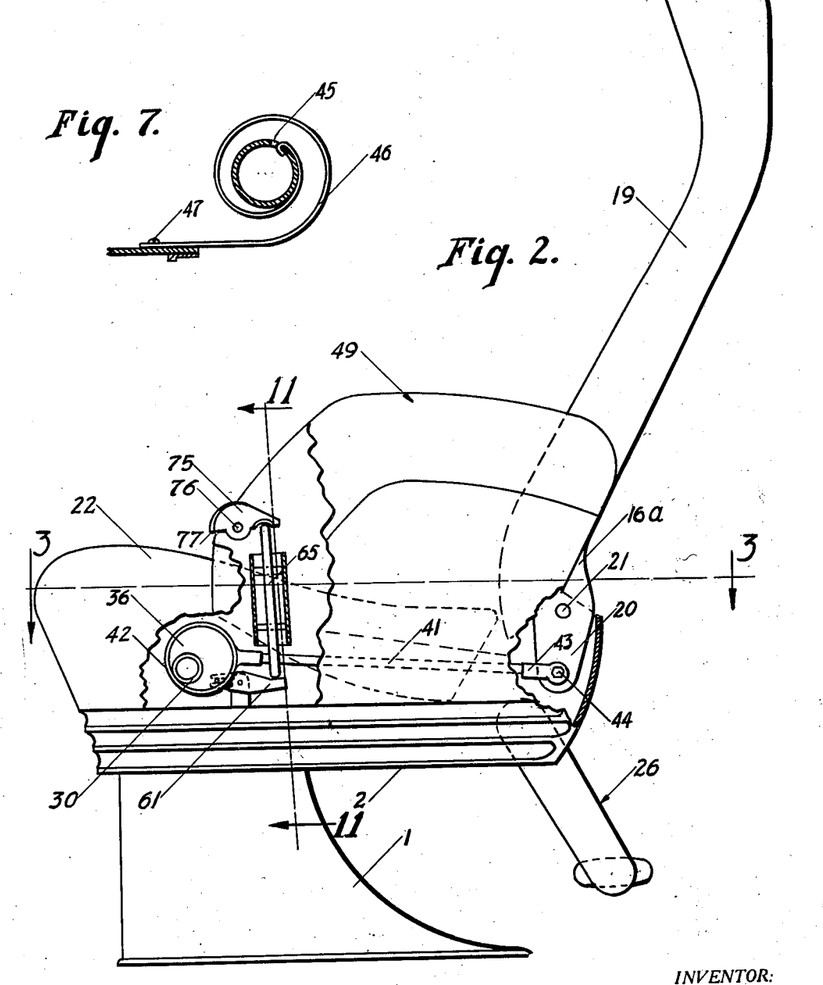
Figure 2 is a view taken from the aisle side with parts of arm rest and seat broken away to show the relations of my control mechanism to the axis of rotation of the control shaft, and with the back in the forwardmost position of adjustment.
Figure 7 is a detailed cross-section taken on line 8—8 of Figure 4 showing the driving spring of the control shaft.
Figures 11, 12, 13:
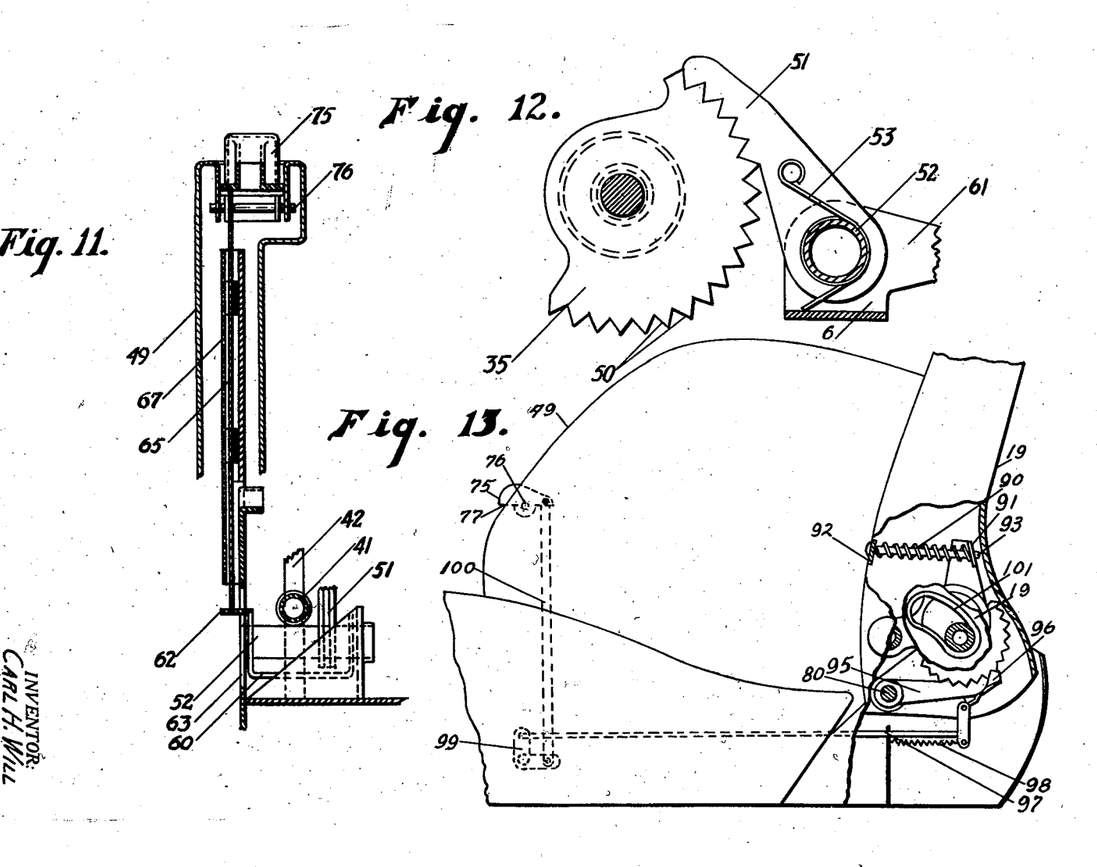
Figure 11 is a detail vertical section on line 11—11 of Figure 2 showing the relation of the parts to the arm rest structure.
Figure 12 is a detail vertical section further illustrating the character of the teeth of the pawl and the locking segment.
Figure 13 is a side view from the aisle side and partly in section, illustrating a modification and with the parts positioned as when the back is in the forwardmost position.

In the case of the control mechanism on the aisle side, it is an object herein to have one which can be easily operated by an upward movement of the hand of the arm which is supported on the arm rest. On the wall side, however, it is the object herein to have a control mechanism with a releasing element which can be easily pushed downwardly. The arrangement of the outer terminal parts of the releasing elements is shown in Figures 1, 2, and 11. While the terminal of the release element at the aisle side is shown as pivoted, and the terminal of the release element at the wall side is shown as slidable, there is no intention to limit the invention entirely to these features. There is, moreover, no intention to limit the invention entirely to twin seat structures.

Referring now to Figures 1 and 2. The numeral 1 indicates a pedestal, and the numeral 2 generally designates the base or chassis supported by the pedestal. In Figure 1 there is shown at 3 a bracket by which the inner end of the base or chassis is attached by the use of suitable fastening devices to the wall of the vehicle. The chassis or base is herein constructed of reenforced metal made lighter by providing openings, not shown.

Figure 3:
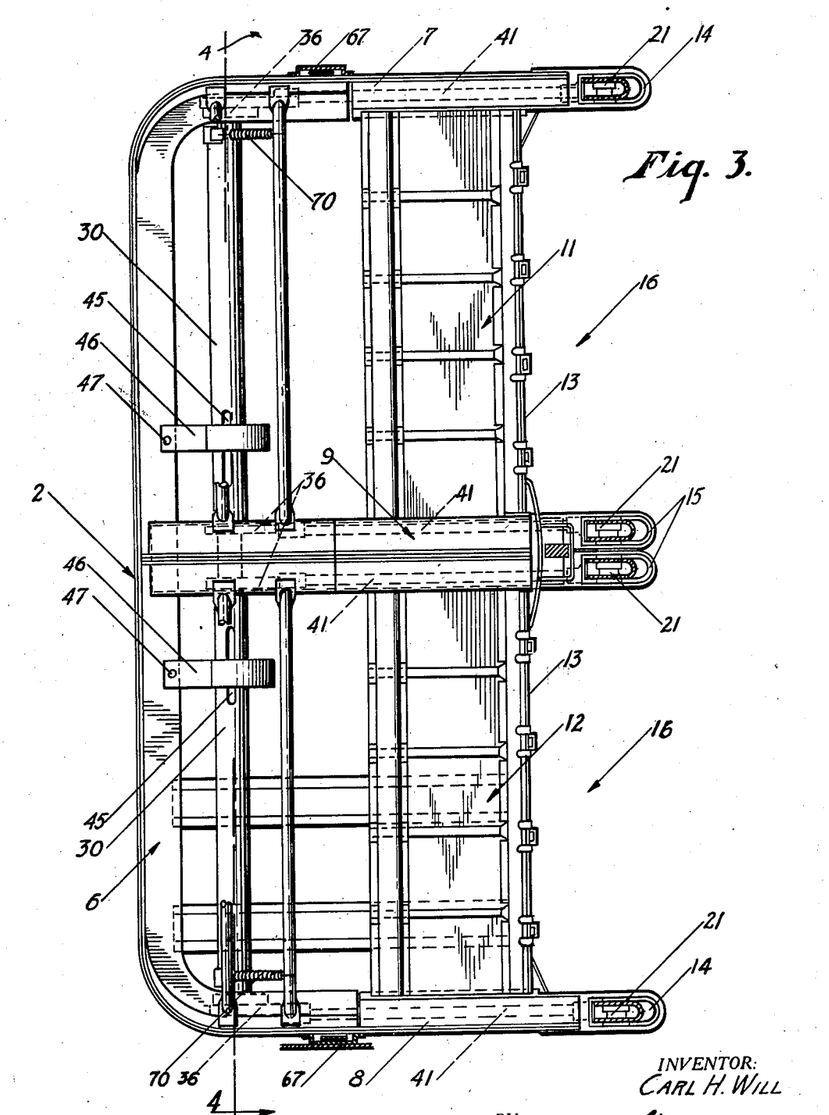
Figure 3 is a plan section taken approximately on line 3—3 of Figure 2, but with the arm rest omitted.

The top plan configuration of the base of the seat is best shown in Figure 3 which, with Figure 2, shows the manner of pivoting the back to the base. The base may be said to be constituted by a U-shaped frame generally indicated at 6. This frame provides rearward extensions 7, 8 which are hollow, for the reception of links by which connection is made between eccentrics on a torque shaft or tube (described below) and the corresponding arm of the corresponding back. A central, rearwardly extending hollow structure is generally indicated at 9 and has a vertically disposed centrally placed wall 10 (see Figure 4) extending from front to back, which wall forms a common support for the bearings of two torque shafts. This wall is common to both tubular housings of the structure 9 and is arranged at the middle of the long dimension of the seat structure. Cross-connecting the arms 7, 8 and the structure 9 are truss structures generally indicated at 11 and 12. The parts are preferably connected by welding. The forward and rear longitudinal marginal portions of the truss structures 11 and 12 are tubular.

It will be noted that elements 7, 8 and 9 project rearwardly of the rearward surfaces 13 of the truss structures 11, 12 and to the rear ends of arms 7 and 8, and to the structure 9 are suitably secured open-top socket members, the outermost members being indicated at 14 and the innermost at 15. The inner sockets are disposed close together as tubular extensions of the two hollow members of the structure 9. The arms 7 and 8 with their extensions 14 and the tubular structure 9 with its extensions 15 cooperate to form for each chair a forwardly extending recess generally indicated at 16.

Each back rest is generally indicated by the numeral 19 and each is substantially identical in construction with the other, each being composed of a tubular frame having substantially the form of an inverted U. It will be understood therefore that each of these back frames provides a pivoting extension, each entering a corresponding socket member. The lower ends or pivoting extensions are suitably pivoted therein as generally indicated at 21.

Each frame has a back cloth on which padding is arranged, and over this padding is secured upholstery material.

A removable seat cushion structure is generally indicated at 22, and it will be noted that the pivotal means 21 for each back 19 are arranged well below the highest part of this removable cushion, and well below the hip joint of a person when seated on the cushion. The recesses 16 provide leg and knee-receiving recesses and these are continued upwardly by corresponding recesses 16A in the back of each back 19. The pivots 21 hold the members of each pair of U-arms in transversely spaced relation and therefore in this form of the invention no cross-braces are needed at any point and thus a relatively large, unobstructed foot, shin and leg room is provided.

A foot rest generally indicated at 26 is provided, but this forms no part of the present invention. It will be seen that the rest structure can be swung to extreme upward and downward positions, at each of which substantially all of the rest with the exception of the foot support is within the forwardly extending recess 16.

Figure 14:
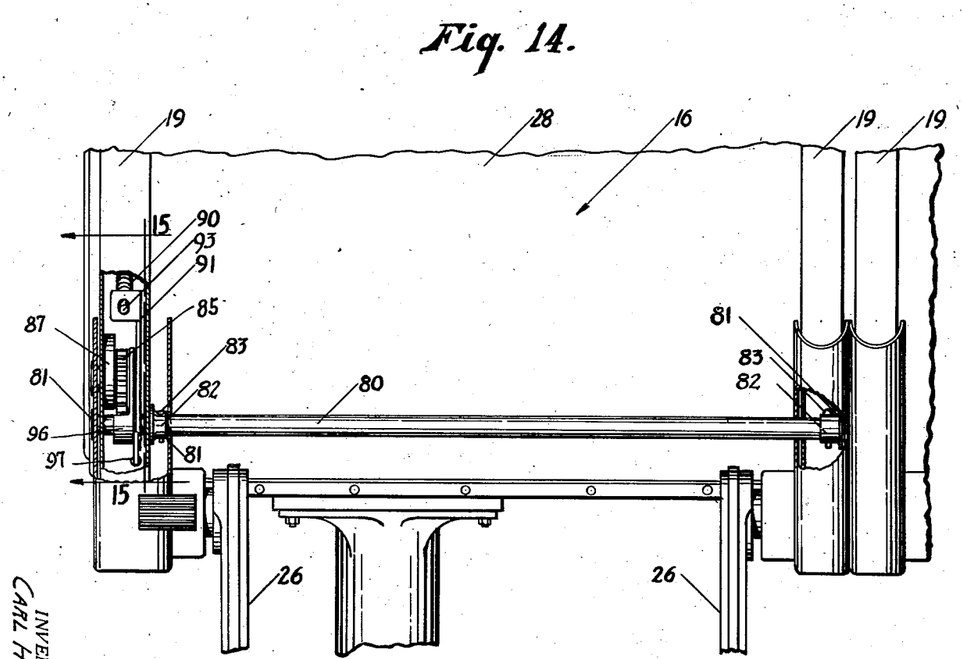
Figure 14 is a rear view, partly in section, further illustrating the modification of Figure 13.
Figure 15:
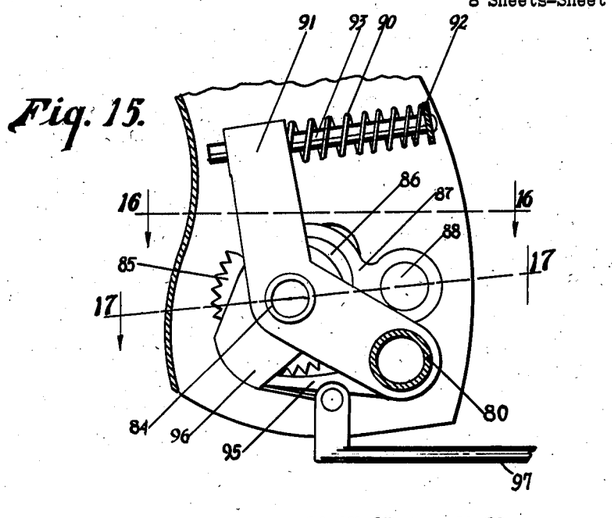
Figure 15 is a vertical section taken approximately on line 15—15 of Figure 14.
Figure 16:
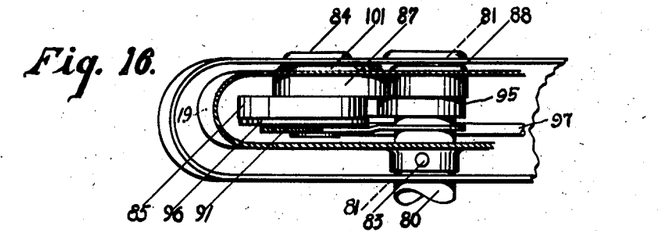
Figure 16 is a horizontal section on line 16—16 of Figure 15.
Figure 17:
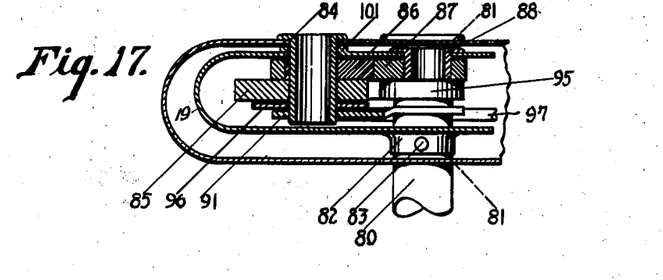
Figure 17 is a horizontal section on line 17—17 of Figure 15.

A hanging back cloth 28 (see Figure 14) is suitably secured to the top of each back 19, and is similarly secured to the sides of the frame. This cloth in combination with the arms of the U-shaped back forms an upward continuation of the recess 16. The bottom of the back cloth extends below the back and is attached to the base by means not shown.

A very important feature of this invention is the means for releasably locking the back in any one of a relatively large number of adjusted positions. It is desirable to have some kind of connection between the pivoted lever arms of each back so that each pair of arms is positively driven in unison or can be made to drive some other member by even application of the driving force, and to this end the present invention includes two ways of accomplishment. In one form a torque shaft 30 is arranged on the base and connections are made between this shaft and the corresponding lower ends of the back or those ends which are below the pivots 21. In the other form the connection is made by cross-connecting the lower ends of each back by a shaft disposed in the pivotal axis of said ends. Each scheme causes the forces to be transmitted evenly and simultaneously to or from the lower ends of the corresponding back frame.

Figures 4, 5, 6:
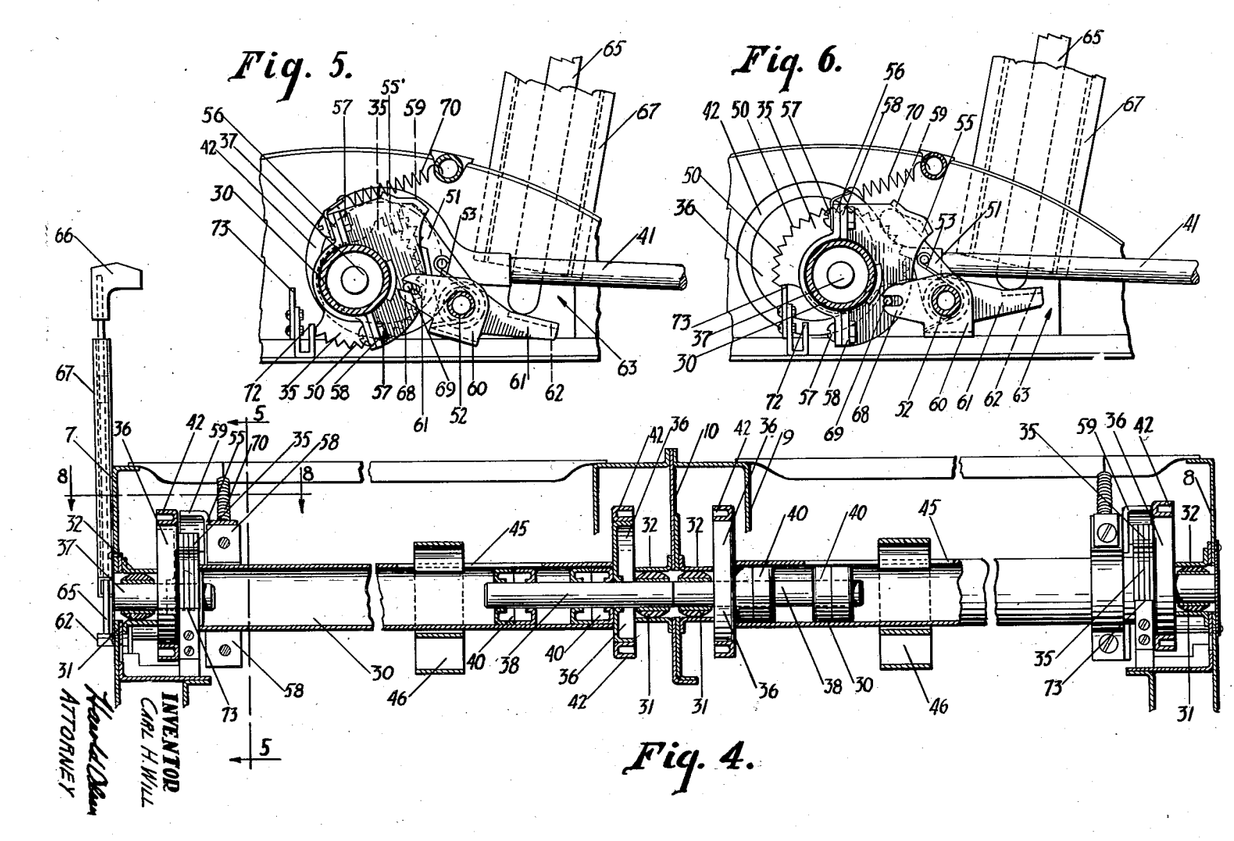
Figure 4 is a vertical longitudinal section taken approximately on line 4—4 of Figure 3.
Figure 5 is a vertical transverse section taken approximately on line 5—5 of Figure 4 with the parts positioned as when the back is in forwardmost adjusted position and with the pawl released.
Figure 6 is a view similar to Figure 5, with the parts positioned as when the back is in the rearmost adjusted position and with the pawl in holding position.

Referring first to Figures 3 and 4. In the first form of the invention the seat is provided with two axially alined shafts 30, each mounted in self-alining bearings generally indicated at 31 Figure 4. An important feature is the arrangement of the control mechanism in relation to the shaft so that the shaft carrying a portion of this control mechanism may be easily assembled and disassembled, and so that the release mechanism may be located at the end of the seat and outwardly beyond the end of the corresponding shaft. Two of the bearings are arranged in the middle frame 9 adjacent one another and are held in tubular extensions 32. The remaining bearings are held in like tubular extensions. It will be noted that each shaft is tubular and that each has at that end which is nearest an end of the base a toothed member 35 suitably welded to that end. Secured as by welding to the toothed member 35 is an eccentric 36, and traversing the eccentric and the toothed member is a stub-shaft extension 37 which is received by the self-alining end bearing 31 as shown. These shaft extensions 37, are immovably fixed in the corresponding eccentrics and toothed members, as by welding. Each tube has two of these stub shafts or extensions, the inner one 38 of each tube, however, being translatable within the tube. It will thus be seen that the outermost shaft extension 37 of the tube can be inserted in an end bearing of the seat base, then the shaft can be alined with the opposite or inner bearing and then the translatable stub shaft 38 can be moved into its bearing. Each translatable shaft 38 in this instance is held in a pair of cups, each generally indicated at 40. The cups are welded or otherwise secured to the shaft, but they slide in the tube 30 and at the same time center the stub shaft. The stub shaft 38 can thus be translated axially relatively to the tube and to the inner eccentric 36 which is welded to that end of the tube.

Each tube in this embodiment has two eccentrics 36 corresponding to the two extensions or lever arms 20 of the back 19 which lie below the pivots 21. Each one of these eccentrics is connected with the corresponding extension 20 of the back by means of a link 41 (see Figure 8) which has at one end the eccentric strap 42 and which is connected at the opposite end as best shown in Figures 2 and 3 by a fork 43 and pivot 44 to the arm 20.

In assembling the shafts 30 the eccentric straps 42 are engaged with the eccentrics, then the outer shaft extension 37 is first inserted in its bearings and after alinement of the shaft with its opposite bearing the translatable shaft extension 38 is moved and this is accomplished through a slot 45 in shaft 30 by a tool inserted through the slot and engaged with one of the cups 40 to translate the shaft into its bearing 32.

In this embodiment the arrangement is such that the occupant of the seat may pull the back backwardly to a reclining position whereat it may be locked by the mechanism now to be described. When the back has been pulled rearwardly to assume the desired back-supporting angle and has been locked in that position and when the mechanism is thereafter released the back will be automatically moved to its forwardmost position. Moreover, the eccentric connections are such that no dead center relations can obtain to interfere with free movement of the back in either direction, either manually to the rearmost position or automatically to the forwardmost position. Moreover, the invention is not entirely limited to the use of eccentrics nor to the direction in which the back is automatically driven.

This forward drive is accomplished by means of a spring 46 attached to the shaft 30 by hooking through the slot 45 (see Figure 7). The outer end of the spring is attached as at 47 to the base 2. The spring as connected in this embodiment is put under greater winding tension when the tube is rotated in counter-clockwise direction as viewed in Figures 2, 5, 6 and 7, that is, when the back is pulled rearwardly. The power for moving the shaft 30 to wind the spring is applied evenly as is the power transmitted by the shaft when rotated by the spring.

Figure 8:
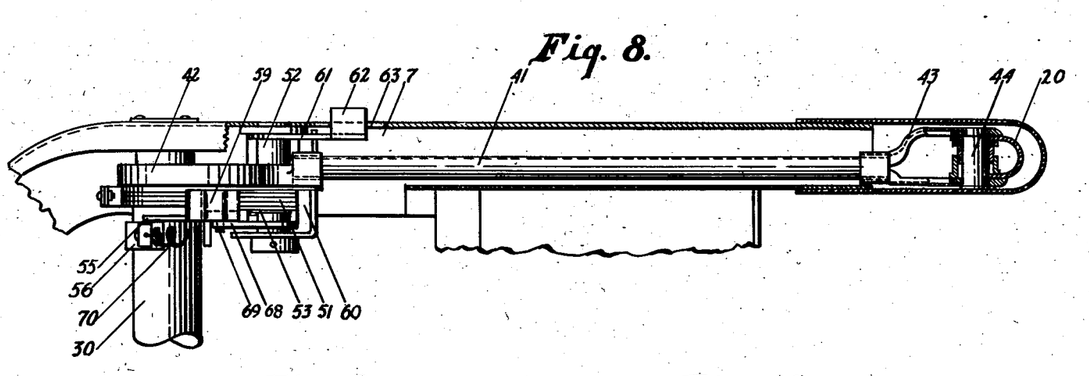
Figure 8 is a plan section taken approximately on line 8—8 of Figure 4, showing the linkage arrangement between the back and the control mechanism.
Figure 9:
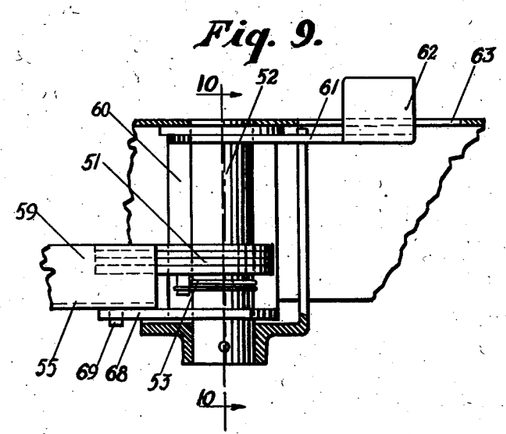
Figure 9 is a plan section with the parts positioned as in Figure 5 further illustrating the pawl-operating mechanism.
Figure 10:
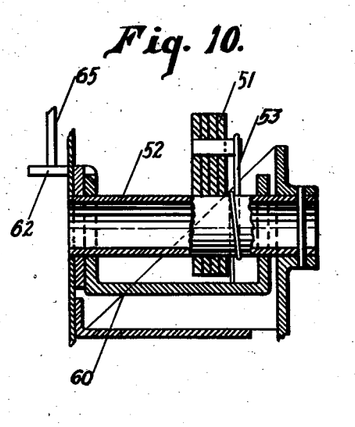
Figure 10 is a vertical section on line 10—10 of Figure 9.

Now referring to the releasable control mechanism which is arranged at the wall side of the unit. The connection of the toothed member or wheel 35 to the eccentric has been previously described. The control mechanism is for holding the torque tube and the eccentrics and the back in any one of a relatively large number of positions which the back may assume. Referring first to Figures 5 and 8 in which the parts are positioned as when the back is in its forwardmost position. The view shows the mechanism released preparatory to pushing the back 19 rearwardly to its reclining position. The releasable mechanisms at each end of the seat are substantially the same with the exception of the direction of motion of the outer terminal elements and their locations. At the aisle side (see Figure 2) the outer terminal element is arranged to permit easy operation of the mechanism while the arm of the occupant of the seat is resting on the arm rest 49.

The toothed member or wheel 35 (see Figure 12) is of laminated structure and has pointed teeth 50 which extend over a relatively long arc of the wheel and opposing faces of contiguous teeth make an angle of about 90° with one another. The pawl 51 has teeth similar to those of the wheel, in this instance five teeth, but it may have a larger or smaller number. This pawl is rotatable upon a tubular member 52 (see Figures 5, 6, 8, 9 and 10) and a suitable spring 53 urges the pawl away from or out of mesh with the teeth of the member 35. Normally the pawl is held in locking position against the action of the spring 53 in the manner shown in Figure 6 by means of a pawl-controlled element, in this case a rock plate 55, swingable upon the corresponding torque shaft 30 (see Figure 4) adjacent the point of connection of this shaft with the toothed member 35. The plate 55 is held by a strap 56. Bolts 57 pass through this strap and through suitable flanges 58 provided by the plate 55. Plate 55 has a lateral extension 59 which engages the pawl.

Mounted on the tube 52 on which the pawl is pivoted is a rockable control element, in this case a frame, generally indicated at 60. This frame has an arm 61 at its outer side, the arm being provided with a lateral lug 62 passing through an opening 63 in the end wall of the base. This lateral lug is engaged by the bottom end of the translatable release element 65 surmounted by a button 66 lying as shown in Figure 1 in an easily accessible position at the inner end or wall end of the base structure. When this button is pressed downwardly by a seated person the frame 61 is rocked to release the pawl. The element 65 is suitably housed and guided in a casing 67.

The opposite end of the frame 60 has a bifurcated arm 68 having its bifurcation engaged with a pin 69 carried by the rock plate 55 which controls the pawl. The rock plate is normally urged by a spring 70 from the position of Figure 5 to that of Figure 6, at which latter position the pawl is automatically held in engagement with the toothed wheel. When the translatable element is depressed by the passenger the rock plate is rocked against the action of the spring 70 and the pawl is automatically released as shown in Figure 5. The leverages are such that little power is required to obtain release of the pawl.

The rocking movement of the tube 30 is limited by a stop 72 for the forward movement of the back under the action of the spring 46 and stop 73 is for limiting the rearward movement of the back. These stops are engaged by portions of the wheel 35. It is understood that when the pawl is released in Figure 6, the spiral spring 46 rotates the shaft 30 in clockwise direction to correspondingly automatically move the back toward its forward position.

On the aisle side the element 65 is operated by a rocking control button 75, pivoted as at 76 and engageable at point 77 by the tips of the fingers while the forearm is resting on the arm rest, to be moved by an upward pull.

It will be noted that the angle of movement of the toothed wheel is relatively much greater than the total angle of movement of the back, in this case about a four to one ratio. This is of advantage because it permits a long toothed face and therefore room for a relatively large number of adjusted positions differing by a small angle, one from the other. This ratio may be increased by the use of the present invention which is of particular advantage in seats which are used on buses where individual requirements as to comfort and degree of incline of the back vary considerably.

In the modification shown in Figures 13 to 17 substantially all of the holding mechanism and controlling means therefor is carried by the back 19 and, as shown, is within the lower portion of one of the hollow arms adjacent its pivotal point with the base.

The pivoting arrangement in this case, as in the first form, is substantially the same, that is, each arm is separately pivoted to the base within the sockets 14, 15. However, instead of using a torque shaft arranged on the base forwardly of that pivotal point as in the first form, the two arms are cross-connected for motion in unison by a hollow shaft 80 which not only connects the arms for this movement in unison, but also serves as the pivotal bearing for the arms. In both forms, broadly speaking, there is a connection by which the arms are positively driven in unison and by which power is transmitted by or through them simultaneously and evenly.

The shaft 80 is suitably journaled in the base or in the sides of the socket members as at 81. Each arm has fixed thereto a sleeve 82, and pin 83 secures the sleeve and therefore the arm, to the shaft 80.

The control mechanism is preferably arranged within the hollow structure of the outermost arm where it is accessible for inspection. The principal parts of this mechanism are therefore movable with the arm or back or equivalent element.

Rotatable on a stationary part 84, in this instance a tube fixed to the base, is a toothed wheel 85. Secured eccentrically with respect to the axis of rotation of this toothed wheel and in this instance fixed to the wheel, is an eccentric 86. The eccentric is pivotally connected by means of a link 87 with the back as at 88 and therefore the connections and relations of the eccentric to the wheel are substantially the same as in the first form of the invention, except that the link is very short, in fact is composed of two merging rings. By this arrangement movement of the arm rotates the eccentric and the wheel, and release of the wheel permits swinging of the arm or equivalent pivoted element.

In the first form of the invention the driving means is a spiral spring of the clock type surrounding a shaft whose axis of rotation is the same as that of the axis of rotation of the wheel. In this form a coil spring 90 is arranged between a stationary part 91 which secures part 84, and a part 92 secured to the back. This spring is herein arranged within the arm but may be arranged at any other suitable place and connected in other suitable ways. The specific arrangement and connections, however, are features. The spring surrounds a bar 93 fixed at one end to part 92 and slidable in stationary part 91. When the back is pushed towards reclining position the spring is compressed and power is stored to automatically force the bar to its opposite position.

The pawl 95 for the wheel 85, in this instance swings about the shaft 80 and is automatically moved by gravity away from and out of engagement with the teeth of the wheel. The control member 96 for the pawl is pivoted on the member 84, at a point between the wheel 85 and the portion of the stationary part 91, which mounts the pivot for the wheel. In this as in the other form this member has a wedging, sliding engagement with the outer portion of the pawl. The member 96 is controlled by a translatable plunger 97, which has a terminal member pivoted to the member 96. The plunger 97 is spring-moved as at 98 to automatically, yieldably hold the control member 96 to correspondingly, automatically hold the pawl in engagement with the teeth to lock the mechanism. The plunger 97 is controlled in this embodiment through a bell-crank 99, in turn operated by a plunger 100, in turn controlled by button 75.

In this instance there is therefore provided a rockable element which is the eccentric, or its mechanical equivalent, and means by which the motion of the arm or pivoted member is transmitted to the rockable member, or vice versa. There is also a toothed pawl adapted for engagement with the wheel, along with means for preventing disengagement of the pawl and along with manually operable means adapted for overcoming the preventing action, to permit the pawl to be released.

The back is provided with means for limiting its movements to opposite extreme positions. In this case this means comprises a flanged arcuate opening or slot 101, the arc having its center in the pivotal axis or shaft 80 of the back, the ends of the opening or slot being alternately engageable with the element 84, acting as a stop. This arcuate opening and element 84 are therefore the general functional equivalent of parts 72 and 73 of the first form of the invention.

The teeth of the wheel 85 and of the pawl 95 are of the same kind as previously described for wheel 35 and pawl 51, and the one to four ratio of movements of back to tooth face is the same as in the first case.

It will be understood that it is not always necessary to have the shaft 89 cross-connect the arms of the back 19.

There are a number of functional likenesses between the two forms of the invention. In both the angular movement of the toothed member is substantially proportionately greater than that of the back or pivoting member. In both the teeth are distributed over a relatively large arc of the circumference. In both the toothed member, eccentric or equivalent element are rotatable about a common axis without necessarily being associated with one and the same shaft. In both the pawl disengages automatically and is automatically held from such automatic disengagement. In both the wheel and pawl are toothed. In both there is a linkage connection between the arm or back and means associated with a rotatable element by which motion of the back drives the element, or vice versa. In both there is power means for automatically moving the back or equivalent pivoted element from one limit position to another when the holding mechanism is manually released. In both the application of force to hold the pawl in is made at the outer portion or near the outer terminal of the pawl to gain leverage. In both the means for controlling the pawl has a sliding, wedging action in relation thereto. In both all the mechanism is above the lowest face of the base. In both the leverages are so arranged that but slight effort is necessary to release the pawl.

In the embodiments herein illustrated, the back is formed by an arched member providing two arms, the bottoms of which are pivoted to the base, and a common power interconnection with both arms is provided so that power is applied simultaneously and evenly to each. The invention is, however, believed to be broader than the application to this particular kind of a back because the long tooth face and four to one ratio of movement between the back and toothed wheel and the automatic pawl release features and the compact structure can be applied to any kind of movable member, even to a member other than a seat back.

Although recognized as a desirable accomplishment, no mechanism for the purpose herein is known to me which is small enough to be placed in a hollow back of a seat and which is of such a nature that it is easy to unlatch and relatch, and which gives a relatively large range of movement of the mechanism to permit a corresponding, relatively large number of positions of the back within range of its movement.

I claim as my invention:

1. A device of the class described, comprising a member pivoted to a base by a hollow terminal extension, said member adapted to be held at any one of the plurality of adjusted positions, a rockable element on the base, means by which motion of said pivoted member is transmitted to said rockable element, or vice versa, a toothed wheel movable with said rockable element, a pawl on the base adapted for engagement with the toothed member, means for preventing disengagement of the pawl, and manually operable means adapted for overcoming the preventing action of said last mentioned means to permit pawl release, said rockable element, motion transmitting means, toothed wheel, pawl and part of said manually operable means being within said hollow extension.

2. A chair structure comprising a base and a back pivoted to the base, a shaft on the base extending in the same direction as the axis of the pivot for the back, means connecting the back to the shaft so that for a given degree of angular swing of the back the shaft is caused to rotate in a relatively much greater degree, said connecting means including an eccentric movable with the shaft, and means connecting the eccentric with the back, a toothed member having a relatively large number of teeth and movable with the shaft, a pawl having teeth engageable with the teeth of the toothed member, a spring for automatically releasing the pawl, and manually operable means for controlling the pawl.

3. A chair having a back including a tubular part, and means pivoting the tubular part to the base, means for adjustably, releasably holding the back at different angles with respect to the base, said means being substantially all within said pivoted tubular part, and including an eccentric on the base, a toothed element fixedly associated with said eccentric and a link connecting said eccentric with said tubular member, and a pawl on the base for engaging the toothed wheel.

4. A chair having a base and a back pivoted thereto, means for securing the back in a plurality of positions comprising a rotatable wheel having a relatively large number of teeth disposed along a relatively large arc of its circumference, and a pawl normally engaged with the teeth of the wheel to hold the wheel against rotation, said pawl adapted to move automatically out of wheel-holding position, swingable means adapted to engage the pawl and hold it in engagement with the wheel, yieldable means for normally holding the swingable means so engaged, and means acting against the force of the last mentioned means to move the swingable means to release the pawl for automatic movement to release the wheel, said swingable means having a slidable movement against the pawl during motion of the parts, and means connecting the back with the wheel in a manner to move the wheel when the back is moved.

5. A chair having a seat base, a shaft rotatably journaled on said base, a back for the chair and means pivoting said back to the base, means connecting the back to the shaft in such manner that power can be applied to the shaft by movement of the back and vice versa, and so that the degree of angular motion of the shaft is substantially greater than that of the back, a wheel attached to the shaft having a relatively large number of teeth disposed along a relatively large arc of its circumference and a pawl pivoted on the base and normally engaged with the teeth of the wheel, means acting to automatically move the pawl out of engagement with the teeth of the wheel, means swingable on the shaft and adapted to apply power to the pawl terminally thereof to hold it in engagement with the wheel, and manually operable means adapted to move the swingable means to release the pawl for automatic movement to release the wheel.

6. A chair having a base having an end wall, said chair having a back and means pivoting the back to a base, a bearing on said end wall, the shaft having a bearing extension in said bearing and removable from said bearing by axial motion away from said wall, an eccentric fixed to the shaft at a point immediately adjacent said bearing, means connecting the eccentric to said back so that movement of the back will rotate the shaft and vice versa, a toothed wheel attached to the eccentric, a pawl normally holding the wheel in any one of a plurality of different positions, and means for controlling the pawl, including an element rockable on the shaft, and a part which passes through an opening in said wall to the outer side thereof, and slidable operating means arranged at the outside of the wall and cooperating with said last mentioned part.

7. A chair structure comprising a base and a back pivoted to the base, a rockable element on the base and means connecting the back with the rockable element so that for a given degree of angular swing of the back the rockable element is caused to move in relatively much greater degree, a member having a relatively long face having a relatively large number of teeth thereon, said toothed member being movable with said rockable element, a pawl on the base having teeth normally engaged with the teeth of the toothed member, means for automatically moving the pawl out of engagement with the toothed member, manually operable means for moving the pawl into engagement with the teeth of the toothed member, said means including a member rotative about an axis which coincides with the axis of the rockable element and which acts on the extremity of the pawl.

8. A chair having a hollow base having an upright end wall which is disposed below the seating level, said chair having a back and means pivoting the back to the base, a bearing in said end wall, a shaft at the front of the base having a bearing extension in said bearing and removable from said bearing by axial motion in a direction away from the wall, an eccentric fixed to the shaft at a point immediately adjacent the bearing, means connecting said eccentric to said back so that movement of the back will rotate the shaft and vice versa, including an eccentric ring from which the eccentric can be withdrawn when the shaft is moved to release it from the bearing, a toothed wheel attached to the eccentric, a pawl on the base cooperative with the toothed wheel to hold the same in each of a plurality of different positions, and a pawl-controlling means rockable on said shaft, and detachable from the pawl during such axial motion.

9. A chair having a base, a back including a tubular part, means pivoting the tubular part to the base, means for adjustably releasably holding the back at different angles with respect to the base, and enclosed within said tubular part and including an eccentric having a toothed face, said eccentric being mounted on and movable about a part which is stationary with respect to the tubular part, a pawl swingable about the pivoting means and operatively engaged with the toothed face, means connecting the eccentric with the tubular part to be moved by the tubular part and vice versa, a spring for moving the tubular part in one direction and means controlling to hold it in or to release it.

CARL H. WILL.